(12) United States Patent
Weaver et al.

(10) Patent No.: US 8,526,426 B2
(45) Date of Patent: Sep. 3, 2013

(54) CONFIGURING GUEST USERS FOR A VOIP DEVICE OF A PRIMARY USER

(75) Inventors: Farni Weaver, Spring Hills, KS (US);
Wen Xue, Overland Park, KS (US);
Talat Jamshidi, Leawood, KS (US);
Nocolas A. Nehme, Olathe, KS (US);
Ihab Amin Guirguis, Aldie, VA (US);
Saurindra M. Basu, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 83 days.

(21) Appl. No.: 13/311,963

(22) Filed: Dec. 6, 2011

(65) Prior Publication Data

US 2012/0076137 A1     Mar. 29, 2012

Related U.S. Application Data

(63) Continuation of application No. 12/236,921, filed on Sep. 24, 2008, now Pat. No. 8,139,564.

(51) Int. Cl.
*H04L 12/66* (2006.01)
(52) U.S. Cl.
USPC .......................................................... 370/352
(58) Field of Classification Search
None
See application file for complete search history.

(56) References Cited

U.S. PATENT DOCUMENTS

| | | | |
|---|---|---|---|
| 6,446,127 B1 | 9/2002 | Schuster et al. | |
| 7,400,881 B2 | 7/2008 | Kallio | |
| 8,320,367 B1 * | 11/2012 | Johansson et al. | 370/352 |
| 2002/0141390 A1 | 10/2002 | Fangman et al. | 370/352 |
| 2005/0180403 A1 | 8/2005 | Haddad et al. | |
| 2005/0198218 A1 * | 9/2005 | Tasker et al. | 709/220 |
| 2005/0232253 A1 | 10/2005 | Ying et al. | |
| 2006/0069726 A1 * | 3/2006 | McKibben et al. | 709/204 |
| 2007/0036298 A1 | 2/2007 | Jain et al. | |
| 2008/0046735 A1 * | 2/2008 | Nedeltchev et al. | 713/173 |
| 2008/0056461 A1 | 3/2008 | Huang et al. | |
| 2008/0084870 A1 | 4/2008 | Taylor et al. | |
| 2008/0130531 A1 | 6/2008 | Chou | |
| 2008/0137644 A1 | 6/2008 | Reynolds et al. | |
| 2008/0186963 A1 * | 8/2008 | Trasi et al. | 370/389 |
| 2008/0250475 A1 | 10/2008 | Tam et al. | |

* cited by examiner

*Primary Examiner* — Otis L Thompson, Jr.

(57) ABSTRACT

A method to providing VoIP telephony to a plurality of users of a VoIP network includes authenticating and registering a primary user to a VoIP device to support call signaling associated with the primary user. A guest user subscriber of the VoIP network having a guest user directory number is authenticated in response to a password. The guest user directory number is mapped to the unique hardware identifier of the VoIP device, and a second set of VoIP parameters are downloaded from the VoIP network to the VoIP device in order to support call signaling associated with the guest user. VoIP calls are then within the VoIP network in response to the mappings of the primary user directory number and the guest user directory number to the same unique hardware identifier.

3 Claims, 6 Drawing Sheets

CONFIGURING GUEST USERS FOR A VOIP DEVICE OF A PRIMARY USER

CROSS REFERENCE TO RELATED APPLICATIONS

This is a continuation of application Ser. No. 12/236,921, filed Sep. 24, 2008, entitled "Configuring Guest Users for a VoIP Device of a Primary User."

STATEMENT REGARDING FEDERALLY SPONSORED RESEARCH

Not Applicable.

BACKGROUND OF THE INVENTION

The present invention relates in general to voice over internet protocol (VoIP) telephone, and, more specifically, to extending use of a VoIP device to a guest user who subscribes to the same network provider.

Traditional circuit-switched voice service is being gradually replaced by packet-based IP network technology such as Voice Over Internet Protocol (VoIP) for improving network efficiency, reducing cost, and enabling advanced calling features. While the service provider's network including the main application servers use fixed assets, the user terminals can be either fixed or mobile (e.g. wireless). One common use of VoIP is for fixed residential service provided via a cable modem (typically referred to as Digital Phone). A wireless digital technology such as WiMAX or EVDO can alternatively be used to connect the user terminal (either fixed or mobile) to the service provider.

VoIP service typically follows the traditional model of telephone usage wherein each subscriber utilizes a directory number (e.g., 10 digit phone number) and one or more personal terminal devices such as a handset or desk phone. The directory number becomes associated during service set-up with an IP network address of the subscriber. Calls can then be made to and from the terminal device with all usage billed to or paid by the subscriber. When a subscriber of a fixed service is away from their fixed location where the VoIP terminal device resides, they must use some other voice telephone service. Even if call forwarding is available so that calls made to the fixed location can be forwarded to a terminal device and telephone number where the subscriber can be reached, there has been no convenient solution for allowing the subscriber to initiate calls from a terminal device of some other user with billing automatically going to the traveling subscriber and not the owner of the terminal device being used.

SUMMARY OF THE INVENTION

The present invention overcomes the foregoing disadvantages of the prior art. In one preferred embodiment, a VoIP end-user device connects to a provider network over a wireless broadband technology such as WiMAX 802.16e. For example, a fixed WiMAX modem, equipped with a wireless antenna to interface with the provider network, can be used having one or more RJ-11 ports to allow for analog handsets to be plugged in for conducting voice calls. In known VoIP implementations, when a device is registered and provisioned in the network, a set of VoIP parameters are downloaded from the network and stored in the device. Depending on the particular network, the VoIP parameters may include 1) IP address of the IMS network entry point, 2) Primary Public User Identifier (PUI), 3) Directory Number (DN), 4) Private User Identifier (PRI), 5) SIP T1/T2 Timer/Counters, and 6) Password (which must not be viewable by the end user). During a call setup these parameters are included within the call signaling and are used by the provider's network to identify the user and to properly route the call. In the prior art, all the VoIP parameters corresponded to the subscribed user's identity and services, and all activity using the set of VoIP parameters was conducted pursuant to being paid for by the subscribed user.

The present invention creates a "guest" user status to permit temporary use by a guest user of a VoIP device owned by another user. The owner of the device is referred to as a "primary" user. The method and system of the invention dynamically register and manage the guest user while keeping the primary user information active on the device (i.e., one device has two active phone numbers attached to it). For example, a device with a network address of device123@kc.provider.com (i.e., an IP address accessible through a DNS lookup) can be associated with phone directory numbers 913-555-5678 and 913-555-9920.

To operate for both users, the device stores two sets of VoIP parameters (one marked "primary" and one marked "guest"). The guest user is a subscriber to the same VoIP network as the primary user, and guest use of the device will be billed to the guest user's account. An expiration time (e.g., a calendar time or an event) will typically be set by the primary user for the guest user. While a guest user is provisioned onto the same device, both the primary and guest users would typically enter an access or identifying code prior to dialing out. This allows the device to send the appropriate VoIP parameters in the signaling to the network for proper identification. The access codes are secret passwords only known to the respective users. Although the example embodiments described herein show one primary user and one guest user, the present invention includes the ability to provision more than one guest user onto a VoIP device simultaneously.

In one preferred aspect of the invention, a method is provided for configuring a VoIP network and a VoIP device of a primary user for use by a guest user. The VoIP device stores a first set of VoIP parameters downloaded from the VoIP network to support call signaling associated with the primary user. The primary user and the guest user are registered users of the VoIP network. A first code is entered on the VoIP device. The VoIP device compares the first code to a stored primary-user code and aborts the method if no match is detected. A guest set-up mode is enabled. A guest access code is stored to be associated with the guest user. A directory number of the guest user is specified to the VoIP device. A second code is entered on the VoIP device (e.g., by the guest user while setting up the guest access). The VoIP device compares the second code to the stored guest access code and activates a guest profile if a match is detected. A second set of VoIP parameters is downloaded from the VoIP network and stored as part of the guest profile on the VoIP device to support call signaling associated with the guest user. SIP signaling is initiated between the VoIP device and the VoIP network including the directory number of the guest user, whereby the directory number of the guest user is mapped by the VoIP network to the VoIP device of the primary user. When the primary user initiates a call from the VoIP device, then the call is initiated using the first set of VoIP parameters. When the guest user initiates a call from the VoIP device, then the call is initiated using the second set of VoIP parameters.

In the event that more than one guest user is provisioned for the VoIP device, then additional guest profiles are created and stored having respective sets of VoIP parameters and respective guest access codes.

DETAILED DESCRIPTION OF PREFERRED EMBODIMENTS

Figure 1:
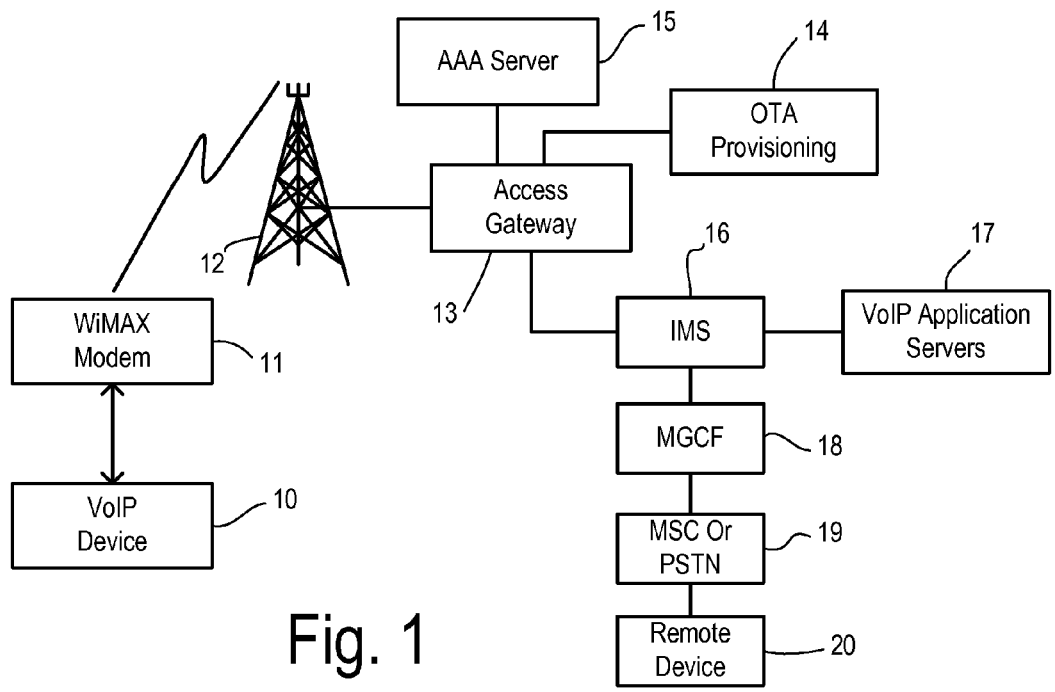
FIG. 1 is a block diagram showing one preferred embodiment of a system according to the present invention.

The present invention involves the provisioning of a guest user on the VoIP device of a primary user. After provisioning, calls can be made to and from the device for and from the guest user or the primary user. When the use as a guest is completed, the invention involves de-provisioning of the guest user from the primary user's device.

In a preferred embodiment, provisioning generally proceeds as follows. Using the VoIP device, the primary user would enter an access code (such as 1234#) and then an option number to enable a guest user set-up mode (e.g., by entering 1#), followed by a duration for which the guest will be allowed the status as a guest user in hhmm format (e.g., 2400# to indicate 24 hours) and entry of the guest user phone or directory number. Next, the guest user would enter their access code on the primary user's VoIP device (e.g., the guest user's subscriber network password such as 4567#). A command message for guest provisioning together with the guest user access code is then sent to the VoIP provider network. If the user access codes are authenticated by the network, then a set of VoIP parameters for the guest user are sent from the VoIP network to the VoIP device and stored in a guest user profile on the device. Consequently, the VoIP device then has both primary and guest user VoIP parameters stored within it. On the network side, both the primary and guest user directory numbers are set by the VoIP network with the same device identifier address for proper routing of calls to or from the VoIP device whether it is being used by the primary or guest user at any particular time.

When making a call from the VoIP device, a particular user (i.e., a primary or guest user) enters their access code followed by the phone number being called. Thus, the VoIP network identifies the correct caller and can bill the usage accordingly. For example, when the guest user is making a call then a possible dialing sequence would be 4567#913-888-1234.

When a user is provisioned onto the VoIP device, the VoIP network maps the directory number of each user to the identifier address of the VoIP device. When another user initiates a call destined to either the primary or the guest user, the network utilizes the mapping of the respective user to route the call to the VoIP device. A distinct ringer may be generated by the VoIP device according to the directory number to which the call was dialed to make it recognizable whether the incoming call is directed to the primary user or the guest user.

The privilege to use the VoIP device as a guest user would preferably expire based on a duration set by the primary user during provisioning or upon the occurrence of some other event. Upon expiration, the VoIP device sends a command to the network to remove the guest user mapping to that VoIP device. Furthermore, the VoIP parameters of the guest user would be removed from the VoIP device. A typical event for expiring the guest user status would be manual removal by the primary user. Upon de-provisioning from the VoIP device, the guest user may preferably be restored to a default mapping by the VoIP network to the primary VoIP device of the guest user at their own home location.

Referring now to FIG. 1, one possible network architecture for utilizing the present invention is shown. A VoIP device 10 is connected to a WiMAX modem 11 which communicates with a wireless base station 12. An access gateway 13 is connected to base station 12 for exchanging data packets between WiMAX modem 11 and the service providers IP network. For provisioning users, access gateway is coupled to over the air (OTA) provisioning 14 and to an AAA server 15. AAA server 15 authenticates users and devices according to unique hardware addresses, digital certificates, and/or passwords. OTA provisioning 14 provides the VoIP parameters needed by VoIP device 10 for signaling a VoIP call, for example.

The service provider network may preferably include an IP Multimedia Subsystem (IMS) 16 coupled to access gateway 13 and to VoIP application servers 17. In order to exchange VoIP calls with users outside the VoIP network, IMS 16 is coupled to a media gateway control function (MGCF) 18 which is interfaced to a remote user terminal device 20 via a mobile switching center (MSC) or the public switched telephone network (PSTN) 19. It should be noted that other network architectures such as a fully landline based network could also be employed.

Figure 2:
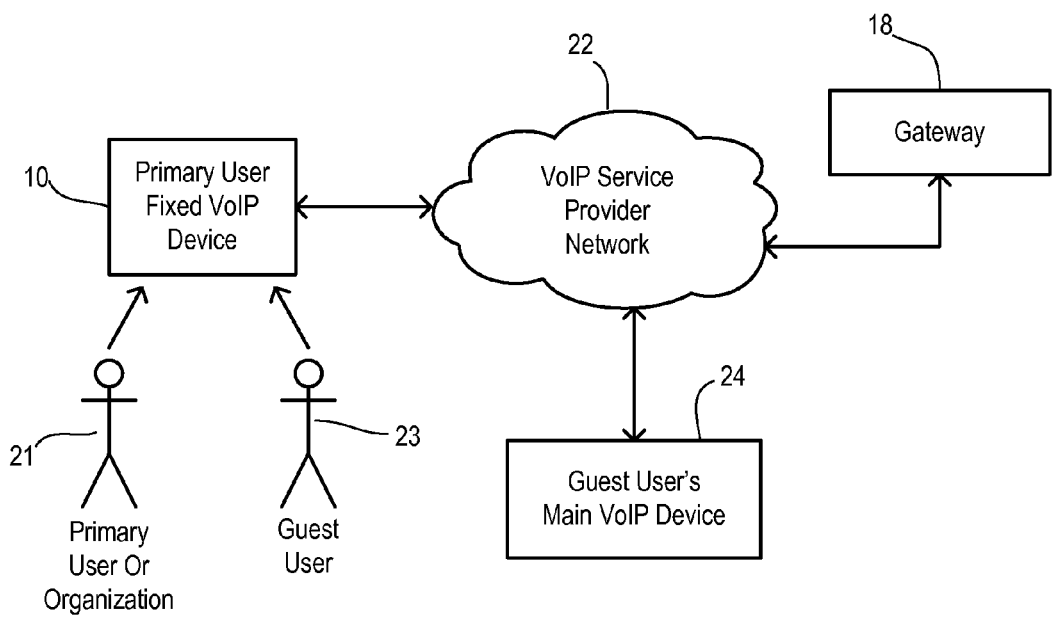
FIG. 2 is a block diagram showing a primary user/guest user relationship.

FIG. 2 shows the relationship between a primary user and a guest user in greater detail. Fixed VoIP device 10 is connected to the service provider's network 22 for accessing VoIP services. Device 10 is assigned to a primary user 21 which may be an individual (e.g., residential) user or an organization or enterprise such as a business providing voice service to its employees or an on-site business providing voice service to its customers (e.g., a hotel). A guest user 23 is assigned to their own respective VoIP device 24. Device 24 acts as their main terminal having a default provisioning making user 23 the primary user of device 24. However, it is desired that when guest user 23 is away from main terminal device 24 that they can become associated with fixed device 10 (e.g., while staying at the hotel of a primary organization 21) in order to initiate or receive calls from there.

Figure 3:
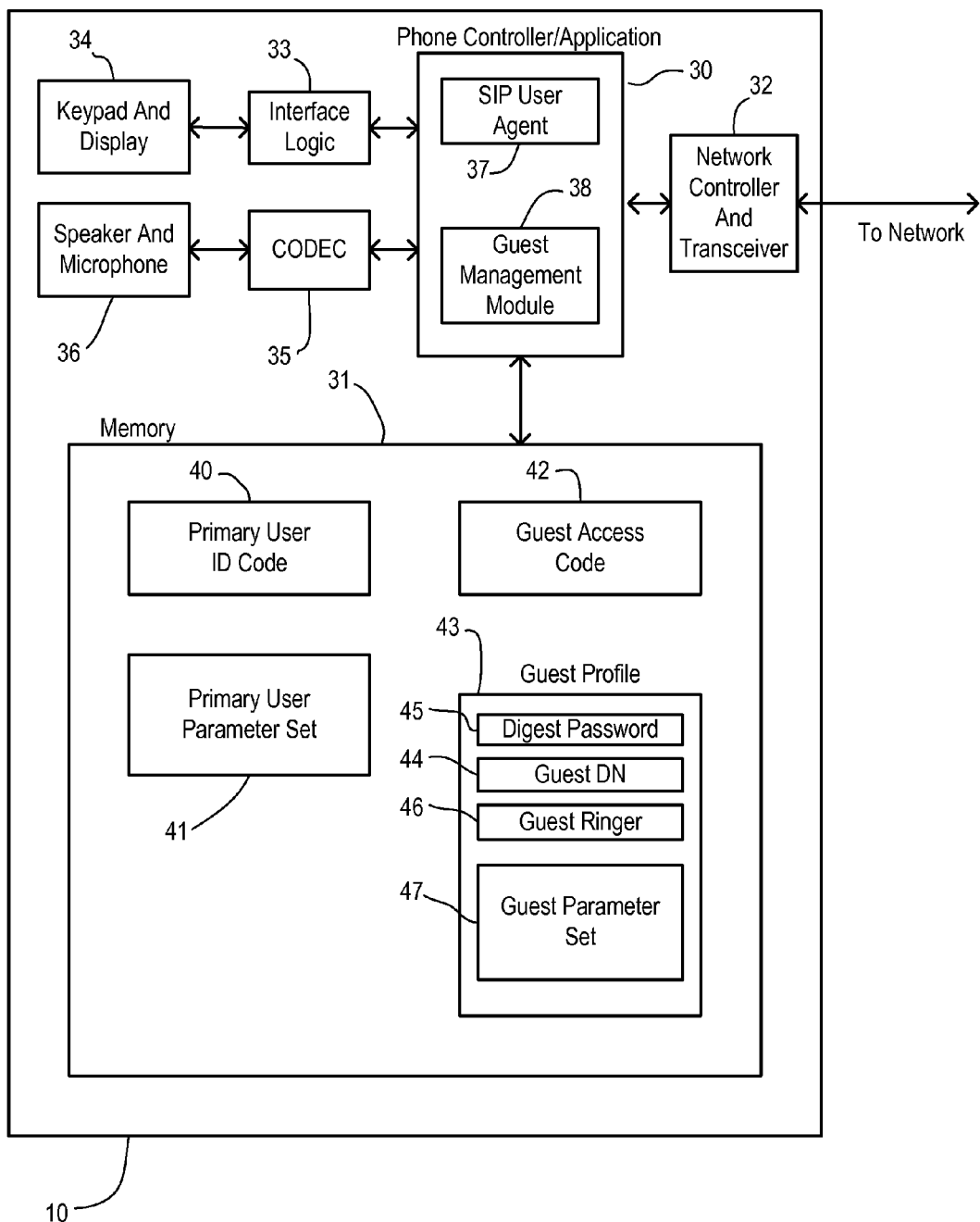
FIG. 3 is a block diagram of a VoIP device according to one embodiment of the invention.

One preferred embodiment of a VoIP device 10 for operating in accordance with the present invention is shown in FIG. 3. Device 10 includes a phone controller/application 30 coupled to a memory 31 and a network controller and transceiver 32 which interfaces to the VoIP network. Interface logic 33 couples a human interface (such as a keypad and display 34) to phone controller 30. A CODEC 35 couples phone controller 30 to a speaker and microphone 36 in the conventional manner. Phone controller/application 30 includes a SIP user agent 37 in the conventional manner. In addition, a guest management module 38 is provided for performing the added functionalities of provisioning a guest user, conducting guest user calls, and then de-provisioning a guest user.

Memory 31 includes locations for storing a primary user ID code 40 and a primary user VoIP parameter set 41. Primary user ID code 40 may be comprised of the primary user's network authentication password stored as a digest password or other encrypted form, for example. Alternatively, a specialized ID code (not shown) stored in memory 31 can be used for accessing the functionality to provision a guest user, thereby allowing anyone with the specialized ID code to authorize someone to obtain guest user status. A primary user parameter set 41 stored in memory 31 is provisioned in the conventional manner.

Memory 31 further stores a guest access code 42 which may be used in various embodiments of the invention to control access to the guest provisioning function itself and/or to authenticate the guest user to the network itself. In one preferred embodiment, guest access code 42 comprises the guest user's network password utilized by the VoIP network and stored as a digest password or in another encrypted form. As described in greater detail below, a network password of the guest user may be retrieved based on an identification by the primary user of the directory number of the guest user. In an alternative embodiment, a local guest access code 42 may be specified by the primary user (e.g., when activating the provisioning process) for the purpose of authorizing the guest user to initiate their respective part of the provisioning process on device 10 (in which case, guest access code 42 may not be sufficient to authenticate the guest user to the network, thereby requiring additional steps for the guest user to initiate network authentication).

A guest profile 43 stored in memory 31 may further include the guest directory number (DN), a digest password 45 for the network (i.e., when access code 42 is a local password), a guest ringer identification code 46 (to be used to signal incoming calls to the guest user), and a guest parameter set 47 similar to primary user parameter set 41 but identifying respective parameters associated with VoIP use by the guest user. Memory 31 may also include storage for access codes and profiles for additional guest users to allow the simultaneous registration of a plurality of guest users.

Figure 4:
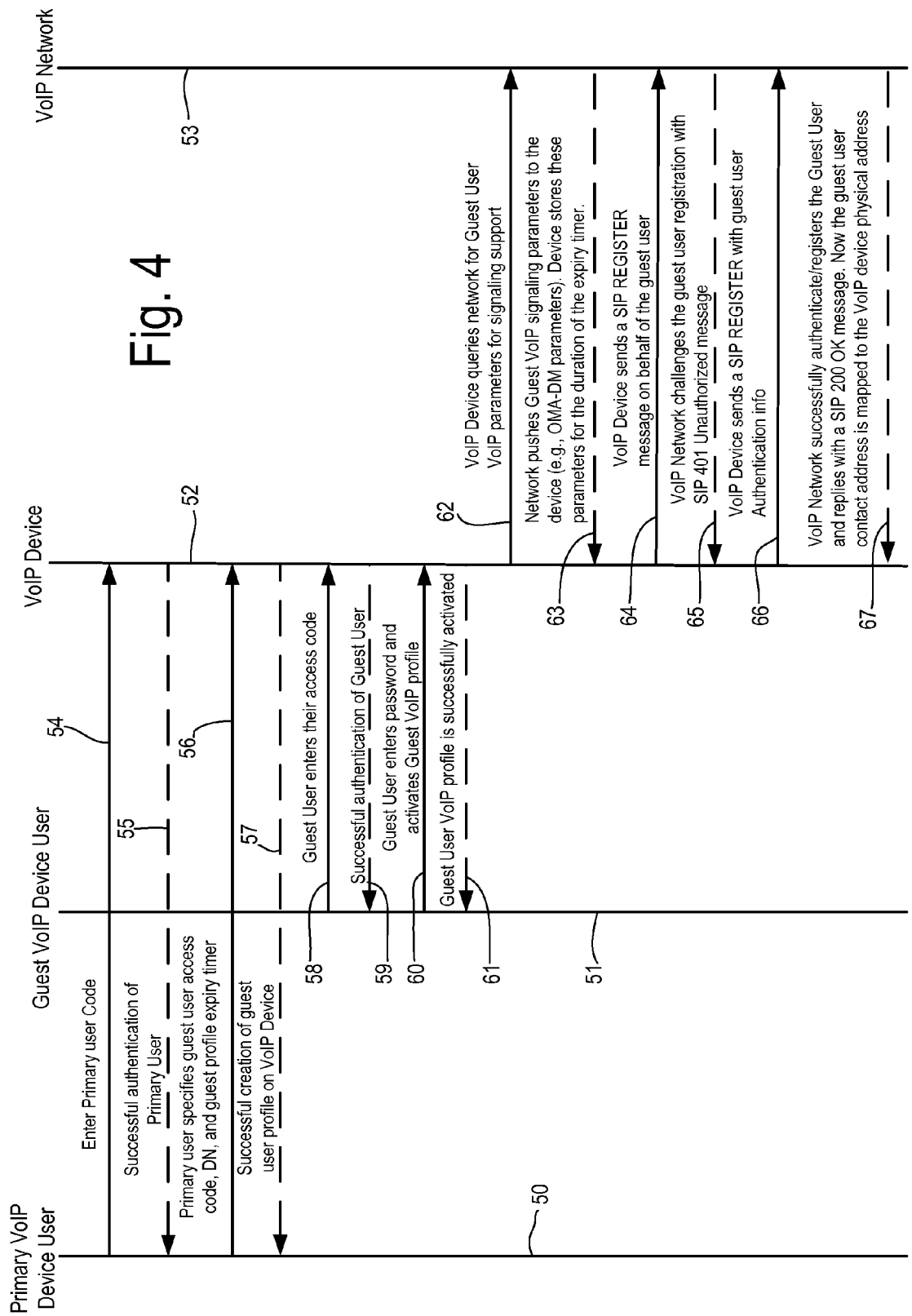
FIG. 4 is a flowchart showing preferred interactions for one embodiment of the activation of a guest user.

Referring to FIG. 4, a process for provisioning a guest user on the primary user terminal device is shown in greater detail. A vertical line 50 represents the primary VoIP device user, vertical line 51 represents a guest VoIP device user, vertical line 52 represents the VoIP device, and vertical line 53 represents the VoIP network. A series of transactions are shown between the different entities. In transaction 54, the primary user enters their personal code (e.g., their network authentication password or a local password for unlocking access to the guest management module of the device application). The VoIP device uses the primary user code to check authentication of the primary user, either by comparing with a value stored in its memory or by consulting the VoIP network. If the code entered by the primary user does not match the stored primary-user code (whether stored in the VoIP device or the VoIP network) the provisioning method is aborted. In transaction 55, the VoIP device indicates to the primary user that there was a successful authentication. In continuing with the provisioning method, the authenticated primary user specifies a directory number or other identifier of the guest user as well as an expiry timer for which the guest profile will be active in transaction 56. The primary user may optionally specify a guest user access code to be used by the guest user during provisioning to add an additional layer of security. In transaction 57, the VoIP device indicates to the primary user a successful creation of a guest user profile which can then be fully configured for operation by the guest user. Thus, the guest user enters a guest access code in transaction 58 (i.e., the guest's local provisioning password or the guest's network password depending upon the particular embodiment). When the guest access code is a local password, the VoIP device indicates successful authentication in transaction 59, thereby prompting the guest user to enter their network password in transaction 60 to thereby activate the guest VoIP profile on the VoIP device. In transaction 61, the VoIP device indicates to the guest user that the guest profile has been successfully activated.

In transaction 62, the VoIP device queries the VoIP network for a second set of VoIP parameters to support SIP signaling in association with call access by the guest user. The query preferably includes the directory number of the guest user and the guest user's network password for identification and authentication. Thus, transaction 62 may involve the AAA server for authentication and the OTA server for supplying the VoIP parameters. In transaction 63, the network pushes the guest VoIP parameter set to the device and the device stores the parameter set for the duration of the guest status according to the expiry timer. The parameter set may include OMA-DM parameters as known in the art.

In response to the VoIP parameter set for the guest user, the VoIP device sends a SIP REGISTER message to the VoIP network (e.g., the VoIP servers) on behalf of the guest user in transaction 64. In transaction 65, the VoIP network challenges the guest user registration with a SIP 401 unauthorized message. In transaction 66, the VoIP device sends a SIP REGISTER with the guest user authentication information. The VoIP network successfully authenticates and registers the guest user and then replies in transaction 67 with a SIP 200 OK message. Consequently, the guest user network address that will be used for SIP proxy services is mapped to the physical address of the VoIP device (e.g., the IP address or a DNS representation of the address).

Figure 5:
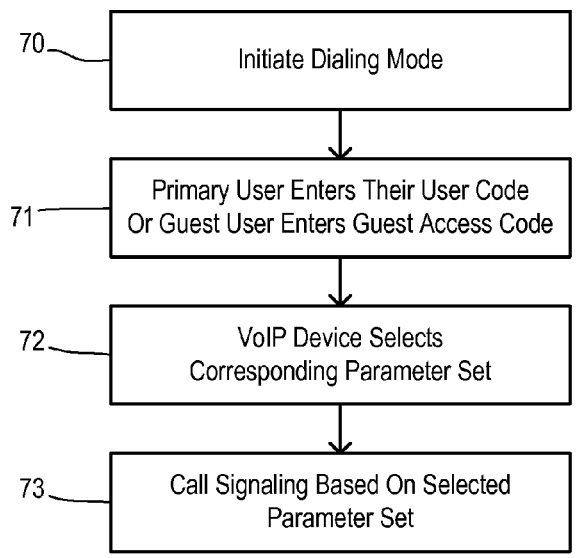
FIG. 5 is a flowchart showing a preferred method for initiating outgoing calls from the VoIP device after a guest user has been activated.

After provisioning of the guest user and prior to expiration of guest status, calls may be initiated from the VoIP device using the method shown in FIG. 5. In step 70, a user initiates a dialing mode (such as by manipulating a keypad on a handset). The respective user enters their user code for identification in step 71. Thus, the primary user enters their primary user code or the guest user enters the guest access code. Based on the identification, the VoIP device selects the corresponding VoIP parameter set to be used for the call in step 72. In step 73, call signaling is performed based on the selected parameter set, and calls are handled for either user as though the call is made from their own terminal device.

Figure 6:
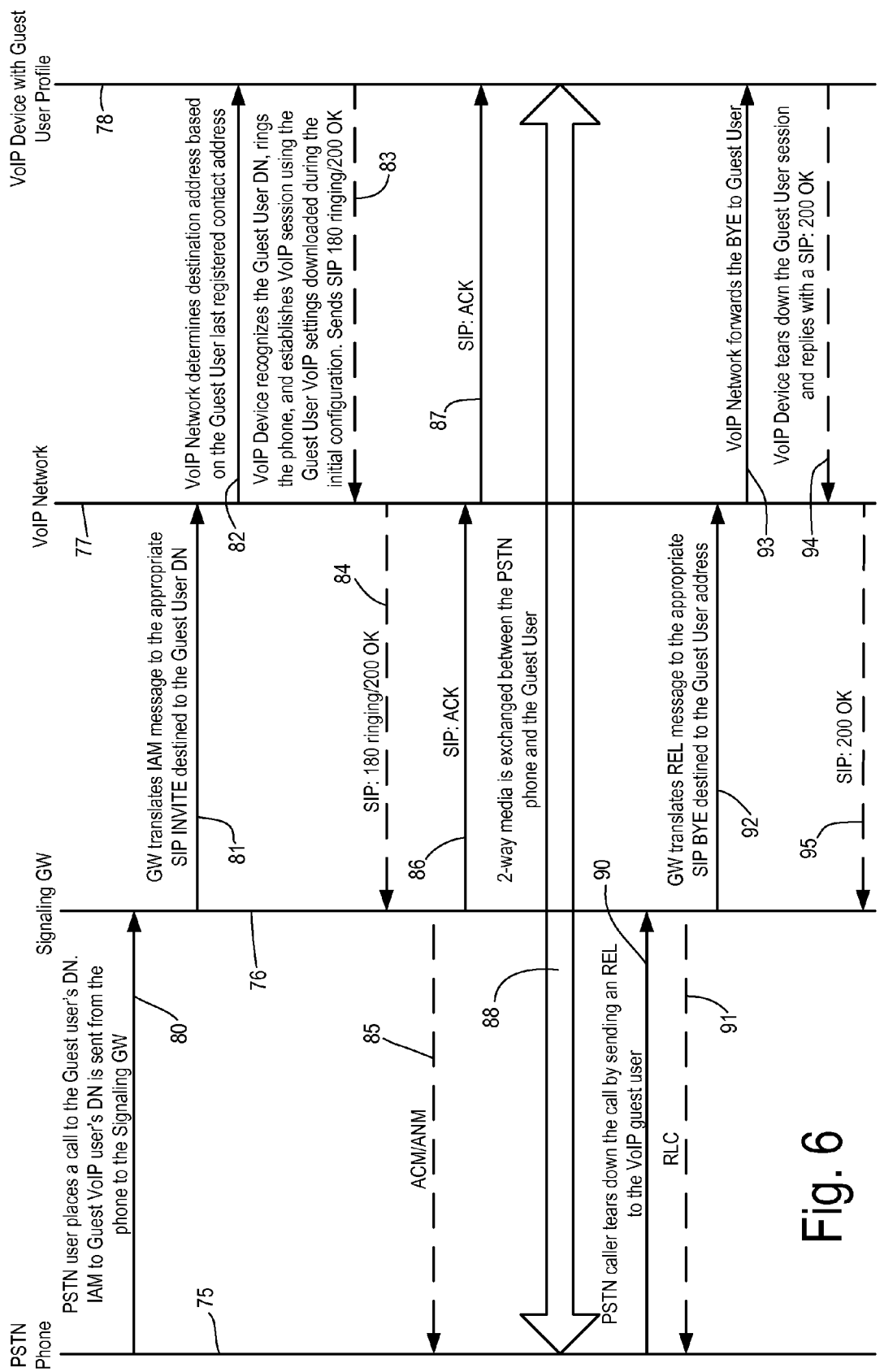
FIG. 6 is a flowchart showing preferred interactions resulting from an incoming call to the VoIP device.

The process followed when a third party initiates a call to the guest user is shown in FIG. 6. Vertical line 75 represents a PSTN phone of a third party caller, vertical line 76 represents a signaling gateway, vertical line 77 represents the VoIP network, and vertical line 78 represents the VoIP device of the primary user which has a guest user profile that has been activated. In transaction 80, the third party caller places a call to the guest user's directory number and an initial address message (IAM) is sent from the caller's phone to the signaling gateway. The message includes the directory number of the called party (i.e., the guest user). In transaction 81, the signaling gateway translates the IAM message to an appropriate SIP INVITE message with a destination corresponding to the guest user's directory number. In transaction 82, the VoIP network determines a destination address based on the mapping of the guest user's network contact address and signals the VoIP device. In response to the signaling from the VoIP network, the VoIP device recognizes the guest user's directory number, rings the phone according to any preconfigured ring tone associated with the directory number, and establishes a VoIP session using the guest user VoIP parameter set downloaded during provisioning. In transaction 83, the VoIP device sends a SIP 180 ringing/200 OK message to the VoIP network. In transaction 84, the VoIP network forwards a SIP 180 ringing/200 OK message to the signaling gateway which sends an ACM/ANM answer message to the PSTN phone in transaction 85. SIP acknowledgement from the signaling gateway to the VoIP network and the VoIP device in transactions 86 and 87. Thereafter, two-way call media is exchanged between the PSTN phone and the VoIP device being used by the guest user in transaction 88.

At the conclusion of the call, the PSTN caller tears down the call by sending an REL message to the VoIP device in transaction 90. In transaction 91, the signaling gateway sends an RLC release complete message. The signaling gateway translates the REL message to an appropriate SIP BYE message destined to the guest user's network address in transaction 92. The VoIP network forwards the SIP BYE message to the VoIP device of the gust user in transaction 93. In transaction 94, the VoIP device tears down the guest user session and replies with a SIP 200 OK message in transaction 94. In transaction 95, the VoIP network forwards the SIP 200 OK message to the signaling gateway and the session is closed.

Figure 7:
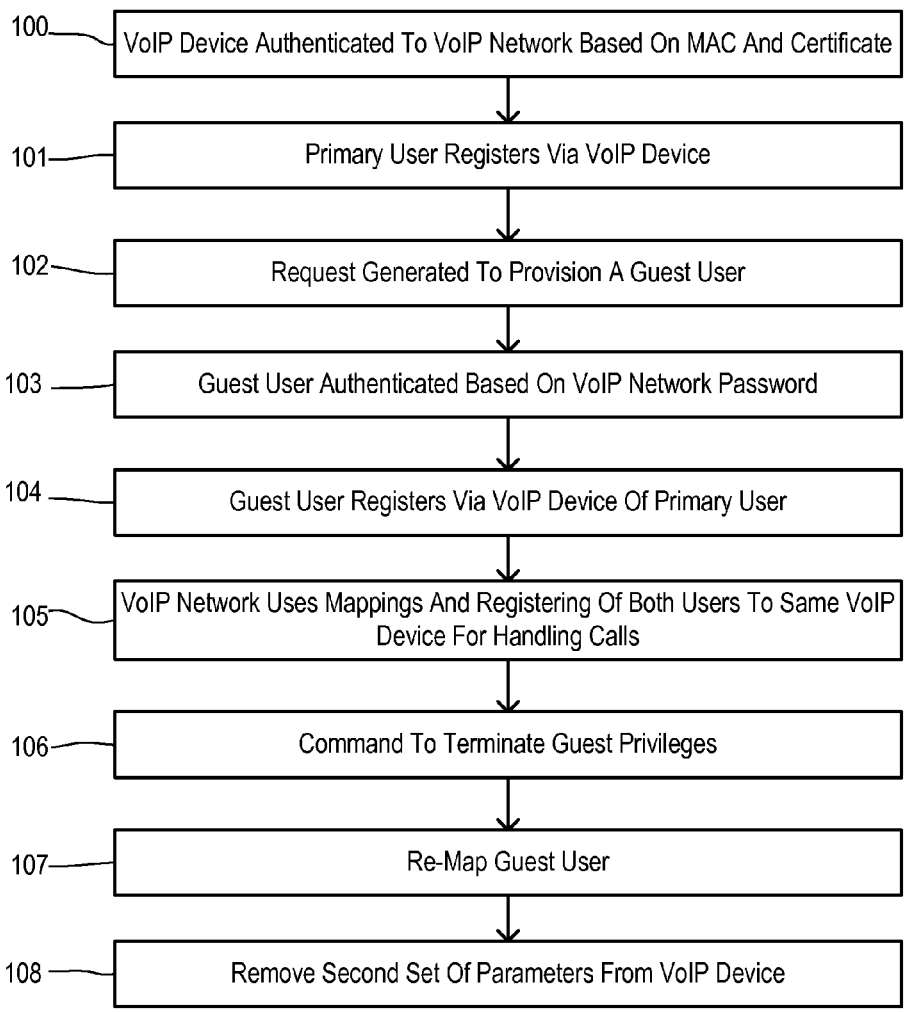
FIG. 7 is a flowchart of a preferred method for operating a VoIP network to enable sharing of a VoIP device between a primary user and a guest user.

The flowchart of FIG. 7 summarizes the operation of the present invention. When first connected with the VoIP network, the VoIP device is authenticated to the network in step 100 based on a unique hardware identifier such as a MAC address and a digital certificate in the conventional manner. When the primary user is provisioned or activated in step 101, they are registered via the VoIP device by sending the MAC address and the digital certificate (e.g., an X.509 certificate) to the network. As a result, the primary user is mapped to the VoIP device according to the MAC address or a DNS lookup of the address. A third party without a matching MAC address could not authenticate to the network and thus would not have access to either the AAA server 15 or OTA provisioning 14, as shown in FIG. 1.

In step 102, a request is generated to provision a guest user on the VoIP device. The request may typically be generated by the primary user using the VoIP device, but could be generated in some other manner within an enterprise system, for example. The guest user is authenticated in step 103. Authentication may be based on providing the guest user's VoIP network password or on other means such as a biometric identification (e.g., fingerprint reader or voice analysis). Upon being authenticated, the guest user registers via the VoIP device of the primary user in step 104.

The VoIP network then uses mappings and registrations of both the primary and guest users to the same VoIP device for handling calls in step 105. In step 106, a command is generated to terminate guest user privileges. The command may be generated in response to the measured expiration of a time period specified during registration of the guest user or may be generated in response to an event such a manual command entered by the primary user. In step 107, the guest user's directory number is remapped by the VoIP network to a default unique hardware identifier for the guest user, such as the guest user's home VoIP device. In step 108, the second set of VoIP parameters corresponding to the guest user is removed from the primary user's VoIP device.

Figure 8:
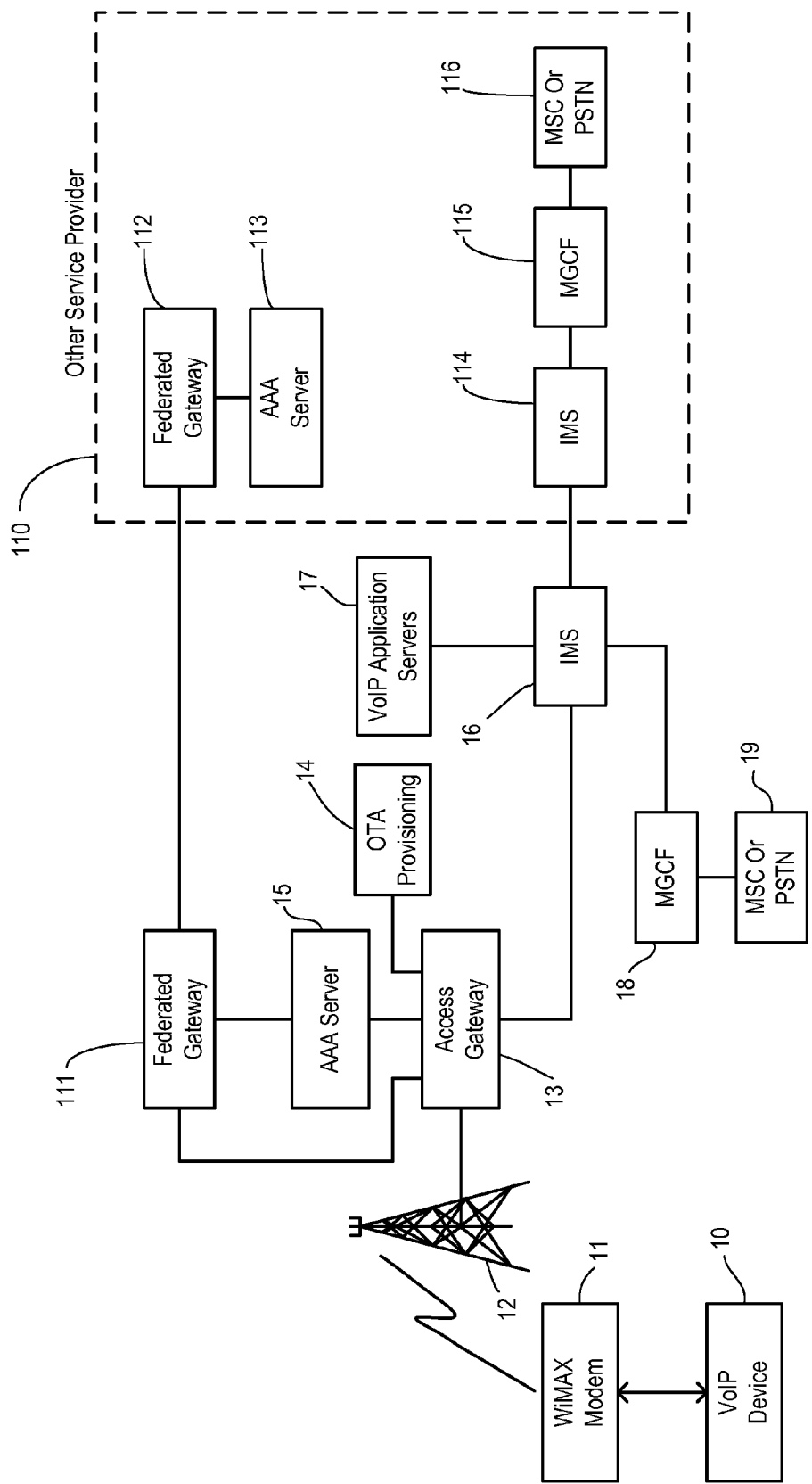
FIG. 8 is a block diagram showing an embodiment of the invention for provisioning guest services for subscribers to a different service provider.

In the previous embodiments, the primary user and the secondary user have been assumed to be subscribers to the same network provider (e.g., Sprint). As shown in FIG. 8, the present invention also includes embodiments that allow the guest user to be a subscriber of a different provider's network such as network 110. A federated gateway 111 in the primary network is coupled to AAA sever 15 and to a federated gateway 112 in network 110. Network 110 has a AAA server 113 coupled to federated gateway 112. An IMS core 114 in network 110 is coupled to IMS core 16 of the primary network and MGCF 115 and MSC 116 of guest's network 110.

Federated gateways 111 and 112 are configured by the network operators to cooperatively allow queries and sending of data responses between networks. Thus, when access gateway 13 fails to identify a guest user after consulting AAA server 15, it forwards a query (e.g., an authentication request) to federated gateway 111 in an attempt to discover whether the guest is a subscriber to a different service provider that has been set up for permitting guest access across networks. Federated gateway 111 contacts federated gateway 112 which then consults AAA server 113 to identify the guest user.

More specifically, the operation involving a guest user of a different provider proceeds as follows. Federated gateway 111 performs a Location Routing Number (LRN) lookup to determine which other network provider "owns" the guest user. Then federated gateway 111 sends a message (e.g., via an XML interface) to federated gateway 112 of the identified provider to request that the guest user be authenticated. Federated gateway 112 validates the password provided in the message and determines whether the guest user's subscription allows for this service. If the guest user is validated, then federated gateway 112 sends a confirmation to federated gateway 11 of the guest user's authentication together with the set of VoIP parameters for the guest user to be downloaded to the VoIP device. This set of VoIP parameters would include the home domain name of the guest user's service provider.

Using the set of VoIP parameters, the VoIP device registers the presence of the guest user by sending a SIP REGISTER message to the primary IMS 16. IMS 16 is peered with IMS 114 so that the SIP REGISTER message is forwarded to ISM 114 so that both networks know the current address to be used for calls involving the guest user. When the guest user initiates an outgoing call, a SIP INVITE message from the VoIP device is sent to IMS 16 which forwards it to IMS 114 which will be responsible for termination of the call. When there is an incoming call for the guest user, a SIP INVITE message generated within guest user's network 110 gets forwarded to IMS 16 since the contact information for the guest user from the initial registration includes the primary network provider's domain name. Both IMS 16 and IMS 114 collect billing information associated with the guest user (such as call usage date) for their billing records. The billing records should be correlated and validated between the network providers to ensure proper invoicing.

What is claimed is:

1. A method for providing VoIP telephony to a plurality of users of a VoIP network, comprising:

authenticating a VoIP device to the VoIP network in response to the VoIP device providing a unique hardware identifier and a digital certificate to the VoIP network for identification;

registering a primary user to the authenticated VoIP device wherein a directory number of the primary user is mapped to the unique hardware identifier and wherein a first set of VoIP parameters are downloaded from the VoIP network to the VoIP device in order to support call signaling associated with the primary user;

sending a request to the VoIP network to provision a guest user for the VoIP device;

authenticating the guest user as a subscriber of the VoIP network having a guest user directory number in response to sending a password of the guest user to the VoIP network;

registering the guest user to the authenticated VoIP device wherein the guest user directory number is mapped to the unique hardware identifier and wherein a second set of VoIP parameters are downloaded from the VoIP network to the VoIP device in order to support call signaling associated with the guest user; and directing VoIP calls within the VoIP network in response to the mappings of the primary user directory number and the guest user directory number to the same unique hardware identifier.

2. The method of claim 1 wherein the VoIP network stores a default unique hardware identifier of the guest user corresponding to a second VoIP device authenticated to the VoIP network in response to a second digital certificate, the method further comprising the steps of:

generating a command for terminating the registration of the guest user to the primary user VoIP device;

re-mapping the guest user directory number to the guest user's default unique hardware identifier; and removing the second set of VoIP parameters from the primary user's VoIP device.

3. The method of claim 2 wherein the command is generated in response to an expiration time specified during registration of the guest user to the primary user's VoIP device.

* * * * *